(12) United States Patent
Sudletsky et al.

(10) Patent No.: US 11,838,169 B1
(45) Date of Patent: Dec. 5, 2023

(54) REMOTE LOGGING MANAGEMENT IN MULTI-VENDOR O-RAN NETWORKS

(71) Applicant: Dell Products L.P., Round Rock, TX (US)

(72) Inventors: William Sudletsky, Ottawa (CA); Muhammad Hassan Ahmad Roshan, Carleton Place (CA); Jia Liu, Newmarket (CA); Thang Pham, Dollard-des-Ormeaux (CA); Ramy Atawia, Kanata (CA)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/958,258

(22) Filed: Sep. 30, 2022

(51) Int. Cl.
*H04L 41/0604* (2022.01)
*H04L 41/069* (2022.01)
*H04L 43/04* (2022.01)
*H04W 8/22* (2009.01)

(52) U.S. Cl.
CPC ........ *H04L 41/0609* (2013.01); *H04L 41/069* (2013.01); *H04L 41/0613* (2013.01); *H04L 43/04* (2013.01); *H04W 8/22* (2013.01)

(58) Field of Classification Search
CPC ............. H04L 41/0609; H04L 41/0613; H04L 41/069; H04L 43/04; H04W 8/22
USPC ....................................................... 709/224
See application file for complete search history.

(56) References Cited

U.S. PATENT DOCUMENTS

| | | | |
|---|---|---|---|
| 10,644,942 B2* | 5/2020 | Kachhla | H04L 41/0803 |
| 11,540,287 B2* | 12/2022 | Singh | H04W 12/037 |
| 11,700,525 B2* | 7/2023 | Grayson | H04W 8/28 370/329 |
| 11,704,148 B2* | 7/2023 | Singh | H04L 69/324 370/329 |
| 11,706,004 B2* | 7/2023 | Lourdu Raja | H04L 5/0076 370/329 |
| 2005/0059406 A1* | 3/2005 | Thomson | H04W 16/00 455/446 |
| 2010/0149970 A1* | 6/2010 | Miranda | H04W 28/02 370/229 |
| 2019/0245740 A1* | 8/2019 | Kachhla | H04L 41/04 |
| 2021/0045193 A1* | 2/2021 | Mishra | H04W 88/14 |
| 2021/0297508 A1* | 9/2021 | Sambandan | H04W 24/04 |
| 2021/0314211 A1* | 10/2021 | Grayson | H04L 41/0213 |
| 2022/0021423 A1* | 1/2022 | Ahmed | H04B 7/0617 |
| 2022/0216600 A1* | 7/2022 | Kumar | H04W 24/02 |
| 2022/0321414 A1* | 10/2022 | Kim | H04W 24/10 |
| 2022/0400412 A1* | 12/2022 | Grayson | H04B 1/0003 |

(Continued)

*Primary Examiner* — Tauqir Hussain
(74) *Attorney, Agent, or Firm* — Larson Newman, LLP (57) ABSTRACT

A radio access network includes first and second hardware systems. The first hardware system instantiates a radio unit (RU) controller of the radio access network. The second hardware system instantiates a RU of the radio access network. The RU includes a plurality of data modules, each configured to provide a logging function for the RU. The RU controller provides a list of access control groups (ACGs) to the RU, each ACG associating an operator on the radio access network with at least one of the data modules. The RU arranges the data modules into logging modules, each logging module associated with a particular ACG, the RU being configured to restrict access to the data modules based upon the logging modules.

16 Claims, 5 Drawing Sheets

(56) References Cited

U.S. PATENT DOCUMENTS

| | | | |
|---|---|---|---|
| 2023/0144337 A1* | 5/2023 | Kumar | H04W 24/02 455/423 |
| 2023/0155864 A1* | 5/2023 | Abdoli | H04L 25/0204 370/329 |
| 2023/0164756 A1* | 5/2023 | Vankayala | H04W 72/121 370/329 |
| 2023/0231651 A1* | 7/2023 | Takeda | H04L 1/0061 370/329 |
| 2023/0232214 A1* | 7/2023 | Uchino | H04W 8/24 455/422.1 |
| 2023/0232342 A1* | 7/2023 | Gutman | H04W 52/325 370/318 |

* cited by examiner

REMOTE LOGGING MANAGEMENT IN MULTI-VENDOR O-RAN NETWORKS

FIELD OF THE DISCLOSURE

This disclosure generally relates to radio access networks, and more particularly relates to providing remote logging management in multi-vendor open radio access network networks.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A radio access network may include first and second hardware systems. The first hardware system may instantiate a radio unit (RU) controller of the radio access network. The second hardware system may instantiate a RU of the radio access network. The RU may include a plurality of data modules, each configured to provide a logging function for the RU. The RU controller may provide a list of access control groups (ACGs) to the RU, each ACG associating an operator on the radio access network with at least one of the data modules. The RU may arrange the data modules into logging modules, each logging module associated with a particular ACG, the RU being configured to restrict access to the data modules based upon the logging modules.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
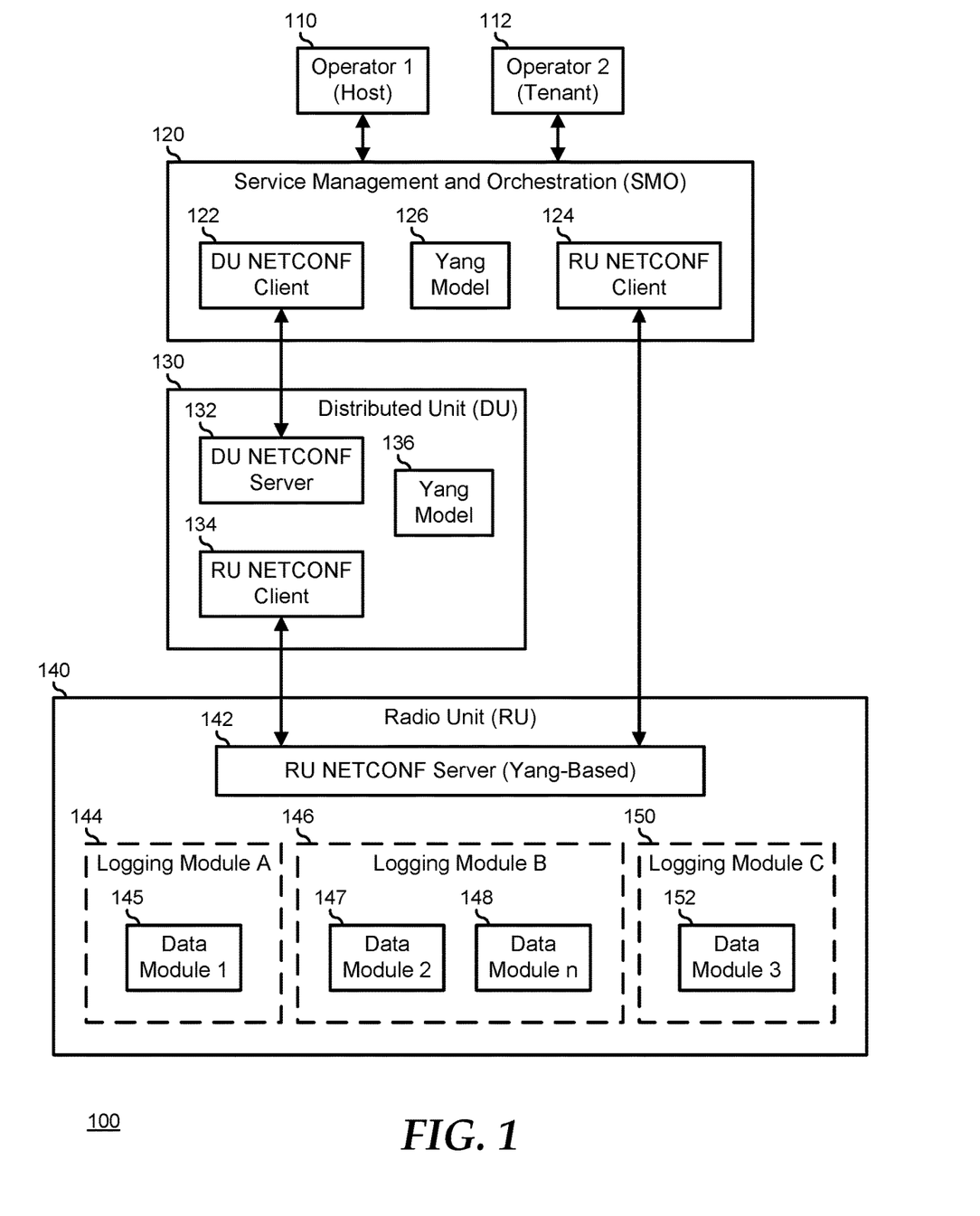
FIG. 1 is a block diagram of a radio access network (RAN) according to an embodiment of the current disclosure.

FIG. 1 illustrates a radio access network (RAN) 100, including operator portals 110 and 112 (hereinafter "operators 110 and 112"), a service management and orchestration (SMO) device 120, a distributed unit (DU) 130, and a radio unit (RU) 140. RAN 100 represents a portion of a mobile telecommunications system that connects remote data communication devices such as cell phones, computers, remotely controller machines, or other remote devices to a core network (not illustrated). In this regard, RAN 100 provides access to operators 110 and 112, where operator 110 may represent an entity associated with a host of RAN 100, and where operator 112 may represent an entity associated with a tenant of the RAN. In a particular embodiment, RAN 100, and particularly the elements of the RAN (for example SMO 120, DU 130, and RU 140), operate in accordance with one or more open R(O-RAN) specification as may be promulgated by the O-RAN Alliance.

Operators 110 and 112 gain access to the monitoring, management, and maintenance of the elements of RAN 100 via SMO 120. SMO 120 represents an O-RAN-specified management framework on the elements of RAN 100 that provides management access to the elements of the RAN. The elements of RAN 100 may represent components from multiple different equipment vendors that are all accessible via standard interfaces to SMO 120. Other elements of RAN 100 that may be managed by SMO 120 may include one or more additional DU, one or more additional RU, one or more central unit (CU), such as a CU control plane (CU-CP) or a CU user plane (CU-UP), one or more real-time radio intelligent controller (RT RIC), near real-time radio intelligent controller (near RT RIC), or non real-time radio intelligent controller (non-RT RIC), as needed or desired.

SMO 120 includes a DU network configuration protocol (NETCONF) client interface 122, a RU NETCONF client interface 124, and a Yang model module 126. In this regard, NETCONF represents a network management protocol that operates in accordance with one or more interface standards as may be promulgated by the Internet Engineering Task Force (IETF). Further, the Yang model represents a data modeling framework for data transmission under NETCONF. While various standards such as O-RAN, NETCONF, Yang model, etc.are described herein with regard to the current embodiments, the teachings of the current disclosure should not be understood to be limited to the described standards, and other standards and architectures for network configuration, management, and data modeling may be utilized with the described embodiments, as needed or desired. For example, other network management protocols, such as RESTCONF, SNMP, or the like, may be utilized as needed or desired.

DU 130 includes a DU NETCONF server interface 132, a RU NETCONF client interface 134, and a Yang model module 136. RU 140 includes a Yang model-based RU NETCONF server interface 142. DU NETCONF client interface 122 is connected to DU NETCONF server interface 132, and RU NETCONF client interfaces 124 and 134 are connected to RU NETCONF server interface 142. Thus it can be seen that RAN 100 can operate in one of two operating models: 1) a hierarchical model where SMO 120 directly monitors, manages, and maintains DU 130, and the DU acts as a relay layer for the SMO to indirectly monitor, manage, and maintain RU 140, and 2) a hybrid model where the SMO directly monitors, manages, and maintains the RU. Note that, both SMO 120 and DU 130 may be referred to generically as "RU controllers."

It has been understood by the inventors of the current disclosure that, in troubleshooting a RAN, an operator may need to rely on manual input from the various vendors of the equipment provided in the RAN in order to know what troubleshooting logs are supported and the logging activities that are recommended in order to strike a balance between computation overhead and verbosity. Moreover, due to the multi-vendor nature of the typical RAN, the operator is faced with determining different supported troubleshooting features each time a new piece of equipment is added to the RAN. As such, automation of the troubleshooting process by the operator is difficult and prone to errors in multi-vendor deployments. Further, the access by the operator to the troubleshooting functions and features of the elements of the RAN is typically not governed by any privacy considerations of other operators on the RAN. That is, where the access to the troubleshooting features of a particular network function (NF) may be deemed to be proprietary to one operator on the RAN, there is typically no standardized mechanism to prevent other operators from accessing those troubleshooting features.

Returning to FIG. 1, RU 140 further includes data modules 145, 147, 148, and 152. Data modules 145, 147, 148, and 152 are each configured to monitor, manage, and maintain the various functions of RU 140, and particularly to provide event logs associated with the particular functions. Examples of data modules 145, 147, 148, and 152 may include network function modules that manage data connectivity such as Ethernet services, file server services, quality-of-service (QoS) management, and the like, carrier function modules that manage carrier chain services, power amplifier services, and the like, board-level function modules that manage temperature monitoring and management, power supply and power level monitoring and management, and the like, or other types of modules that monitor, manage, and maintain other functions of RU 140, as needed or desired.

RU 140 may include one or more additional data module in addition to data modules 145, 147, 148, and 152. Such additional data modules may be organized in a hierarchical arrangement, such that, where a higher level data module is providing logging capabilities, the logging capabilities of the included lower level data modules are likewise enabled, and where a lower level data module may be enabled without necessarily enabling the higher level data module. Data modules 145, 147, 148 and 152 are illustrated as being grouped into logging modules 144, 146, and 150. The grouping of data modules 145, 147, 148 and 152 into logging modules 144, 146, and 150 will be described further below. Data modules 145, 147, 148, and 152 may be instantiated in software, in firmware, in hardware, or the like, as needed or desired.

For the purposes of the current disclosure, an important function of data modules 145, 147, 148 and 152 includes providing logs for various events occurring on the associated data modules. The event logs represent portions of a memory device of RU 140 that store information related to the events, including the type of event, the data and time of the event, a severity level for the event, and the like. In addition to consuming memory resources of RU 140, the logging of events on data modules 145, 147, 148, and 152 represents the consumption of processing resources of the RU to signal the occurrence of the event, to classify the event, to store the event information to the event log, and to provide indications to other elements of RAN 100 (e.g., SMO 120 and DU 140), and the like. As such, the amount of event logging associated with each of data modules 145, 147, 148, and 152 may have a direct impact on the performance of RU 140 in its capacity to provide the other functions and features of the data modules. As such, it may be desirable for one or more of operators 110 and 112 to configure data modules 145, 147, 148, and 152 to provide different amounts of error information based upon the usage of the data modules and the needs or desires of the operators.

Data modules 145, 147, 148, and 152 may provide event logging based upon different event logging types, including trace logging and troubleshoot logging. Trace logging may produce the most fine-grained information only used in rare cases where full visibility of what is happening in the data module is needed. As such, the logs produced during trace logging may be expected to be more verbose, consuming a maximum amount of processing and memory resources of RU 140. Because of the verbosity, trace logging is typically enabled only on an as-needed basis at the direct request of one of operators 110 and 112. Further, the logs produced by trace logging are usually generated until an allotted memory space is full. Then, a trace log file can be uploaded to DU 130 or SMO 120, for further evaluation by operators 110 and 112. Then, the process of trace logging and uploading of trace log files is continued until such time as the operator directs the data module to halt the trace logging.

Troubleshoot logging may produce less granular information that may be suitable for everyday troubleshooting, system diagnostics, or event recording, as needed or desired. However, troubleshoot logging operates to write to an allotted memory space, and when the memory space is full, additional log entries typically overwrite older log entries in the memory space. As such, troubleshoot logging may not be as reliable in capturing a critical log entry due to the loss of log entries with time.

Further, the types of log entries may provide indications as to different severity of the information included therein. For example a log entry may include a highest severity level such as a FAULT entry, a medium severity level such as an ERROR entry, and a lowest severity level such as a WARN entry. FAULT entries may represent information indicating that the associated data module encountered an event or entered a state such that one or more function of the data module is no longer operational. ERROR entries may represent information indicating that the associated data module encountered an event that represents a problem has occurred with a particular function of the data module. An ERROR entry may represent a condition of a function that needs to be addressed to maintain an optimum level or performance by the data module, as opposed to a FAULT entry that may indicate a total failure of that function. WARN entries may represent information indicating that the associated data module encountered an event that was unexpected.

In the current embodiments, functions, features, mechanisms, and methods are provided whereby elements of a RAN operate to broadcast their logging capabilities, recommend logging capability controls, reporting intervals, supported logging formats, and the like. The embodiments provide for access control groups (ACGs) to limit the access to the logging capabilities of the various NFs. The current embodiments further permit the shaping of the logging capabilities as needed or desired to balance computational resources and the depth of logging information, and provide for recommendations for allocations of logging resources, logging severity levels, and logging types to the operators of the RAN. Further embodiments provide for the selection of log file formats and capabilities by the operators of the RAN, as needed or desired.

In general, the current embodiments provide for the broadcasting of the logging capabilities of the NFs (e.g., CU-CPs, CU-UPs, DUs, RUs, near-RT RICs, etc.) to an operator (for example via a SMO), and enable real-time management and configuration of the logging capabilities in multi-vendor deployments. The logging capabilities are implemented by a generic base model to enable a standardized interface. The base model can be extended to support any vendor specific logging module and level. The operator can be local on the RAN nodes (i.e., the NFs) or can be remote (such as on a cloud deployed SMO). The log configurability interface may be restricted by the logging capabilities reported by the NFs.

In a particular embodiment, NFs on a RAN operate to customize the reported logging capabilities based upon operator-based access control groups (ACGs). The ACGs provide for secure compartmentalization of access to the logging capabilities of the data modules on the NFs, so that the confidentiality may be maintained with the multi-vendor deployment, and the logging traffic and resource utilization can be minimized. As such, different ACGs may be provided with different privilege levels for read, write, and execute functions over the various data modules within the NFs. To form the customized report of the logging capabilities, the NF first receives a list of the ACGs and the associated privilege levels of each ACG for each of the data modules instantiated on the NF. An example list of ACGs is shown in Table 1, below.

TABLE 1

Initial Module Rules Table for AGC

| SW Module | ACG 1 | ACG 2 | ACG 3 |
|---|---|---|---|
| Module 1 | RW | R | — |
| Module 2 | RW | — | — |
| Module n | RW | RW | R |
| Module 3 | RW | — | — |

The NF then operates to create logging modules associated with the ACGs and that group the data modules such that each ACG only has visibility into those data modules that the ACG is supposed to access. In this way, not all data modules need to be operating simultaneously, thereby reducing the processing and memory usage in the NF, and also reducing the network traffic between the NF and the SMO. Further, the logging modules operate to constrain the NF from providing logging information to ACGs that are not supposed to have access to the logging information. The logging modules will be understood to operate to limit access to the logging information of the data modules to the associated ACGs. However, this does not prevent a particular NF from instantiating or utilizing internal logging modules as needed or desired. In an initial processing step, a NF may operate to provide a one-to-one mapping between data modules and logging modules and to store the corresponding list of ACGs that have read (R) or read/write (RW) access to that data module. An example of a logging module table is provided in Table 2, below.

TABLE 2

Generated ACG-Aware Logging Module Table

| Logging Module | SW Module | ACG |
|---|---|---|
| Module A | Module 1 | 1 and 2 |
| Module B | Module 2 | 1 |
| Module C | Module 3 | 1, 2 and 3 |
| Module D | Module n | 1 |

In a next step, the NF operates to reduce the number of logging modules by combining the logging modules that have the exact list of ACGs to reduce the size of capability message and the number of configurable parameters. Here, an algorithm for reducing the number of logging modules is given as:

For Each logging module m and logging module n
  IF ACG list (Lm) ACG list (Ln)
    Combine logging modules m and n
    Combine SW modules
    Add the compressed entry in the logging modules table
END FOR An example of a compressed ACG-aware logging module table is provided in Table 3, below:

TABLE 3

Compressed ACG-Aware Logging Module Table

| Logging Module | SW Module | ACG |
|---|---|---|
| Module A | Module 1 | 1 and 2 |
| Module E (original: B + D) | Module 2 and n | 1 |
| Module C | Module 3 | 1, 2 and 3 |

Figure 2:
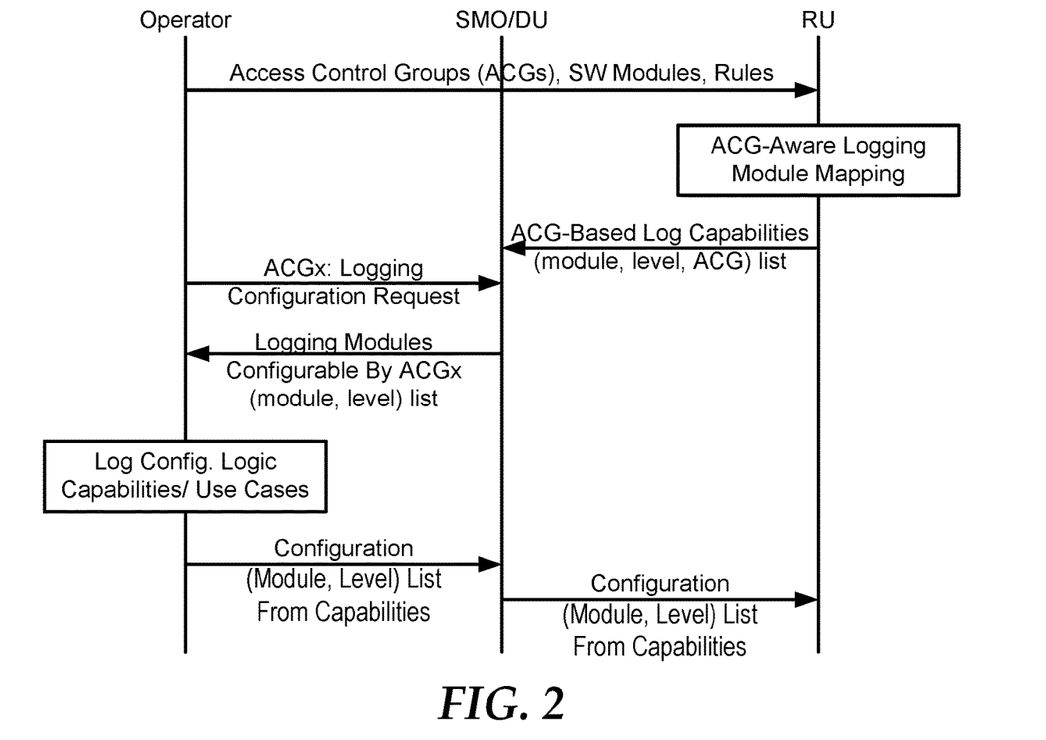
FIG. 2 illustrates a method customizing the reported logging capabilities based upon operator-based access control groups (ACGs) according to an embodiment of the current disclosure.

FIG. 2 illustrates a method for customizing the reported logging capabilities based upon operator-based ACGs. The operator provides initial model rules for the data modules in a RU for the ACGs associated with the operator. The initial model rules may be similar to those shown in Table 1, above. The RU maps the initial rules to logging modules and compresses the logging modules, and provides the ACG-based logging capabilities to the SMO/DU. The capability message may contain only the logging module that can be configured remotely by the operator associated with the ACGs. In a particular case, other logging modules that are not configurable by the operator associated with the ACGs will not be provided in the capability message.

When a particular operator makes a logging configuration request, the ACG associated with the operator is determined (ACGx), and the SMO/DU provides a list of the logging modules that are configurable by ACGx back to the operator. The operator utilizes the list of the logging modules that are configurable by ACGx to determine the desired use cases for the logging activities of the RU. The operator can then provide a configuration to the SMO/DU to be forwarded via NETCONF to the RU to configure and execute the logging functions of the logging modules associated with ACGx. In a particular embodiment, the SMO/DU operates to substantiate that the operator is authorized to request the logging configuration of the target data module based upon the ACG-based logging capabilities provided by the RU. If the particular operator makes an unauthorized request, the request is discarded by the SMO/DU. In any case, the RU is similarly capable of dropping unauthorized requests. In this way, the RU can monitor and substantiate the incoming requests, even if the SMO/DU is not enabled to manage ACG-based request partitioning.

In another embodiment, a NF such as RU 140 operates to broadcast the logging capabilities (for example data modules 145, 147, 148, and 152) to an operator, for example, via SMO 120. The logging capabilities may further include information related to the characteristic of the logging capabilities, such as logging types, logging severity levels, and the like. Further, the logging capabilities may include information related to the support provided by the NF to the particular data module, such as the memory allocated for the logs locally on the NF, the maximum duration that logs can be enabled and thus avoid performance impact due to logging at high load scenarios, and the like. In a particular case, the support provided may be allocated per data module, per logging type, per logging severity level, or the like. For example, a particular NF may allocate logging resources globally for all data module logging functions, or may allocate resources differently for the data modules instantiated on the NF, as needed or desired.

Further, when a particular data module is set to the INFO level, the NF may provide that the log file includes 5,000 entries, when the data module is set to the Error level, the log file may include 10,000 entries, and when the data module is set to WARNING, the log file may include 7,500 entries (the lower number being due to the fact that the log entries of the different log levels may occupy different memory sizes. The capabilities information may further include global logging information, such as the maximum number of data modules that can be set to the INFO log level, the maximum number of data modules that can be set to the WARNING log level, and the maximum number of data modules that can be set to the VERBOSE log level.

In a particular case, the logging capabilities of the NF are configurable by the operator. Here, after receiving the logging capability information, the operator may direct the SMO/DU to reconfigure the logging capabilities of the NF. For example, the operator may reconfigure the logging capabilities of the individual data modules, or of the logging support provided to for logging activities globally by the NF, as needed or desired. Further, the operator may assert a priority scheme on the execution of the logging modules created by the NF. For example, the NF may set a default that any logging module that has a data module that is placed into a ERROR log level takes priority over all other logging modules, in terms of resource allocation and the like. An operator associated with the host of the RAN may reconfigure the priority as needed or desired. For example, a data module included in a logging module associated with an ACG of the host operator may enter the WARNING log level after another data module has entered the WARNING log level. Under the default priority, the first data module to enter the WARNING log level would take precedence. However, the host operator may choose to assert a revised priority scheme such that the data module associated with the ACG of the host operator takes the priority.

Figure 3:
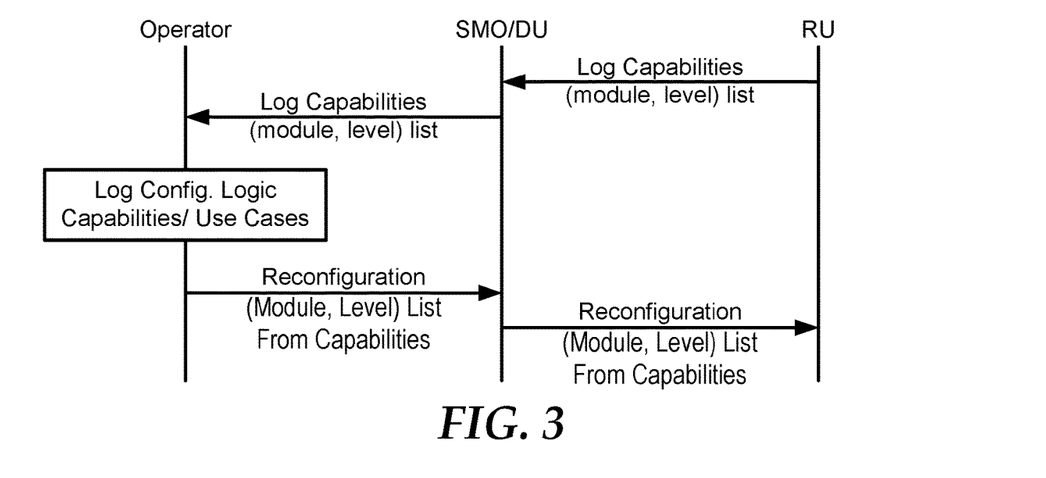
FIG. 3 illustrates a method of reporting logging capabilities by a network function (NF) of a RAN, and the reconfiguration of the logging capabilities by an operator on the RAN according to an embodiment of the current disclosure.

FIG. 3 illustrates a method of reporting logging capabilities by a NF of a RAN, and the reconfiguration of the logging capabilities by an operator on the RAN. An RU reports the logging capabilities of the RU to the SMO/DU and the SMO/DU provides the logging capability information to the operator. The logging capability information from the RU may include per-data-module information, per-logging-module information, global information, or the like. The operator receives the logging capability information and evaluates the use cases of the logging capabilities to determine reconfigurations for the RU, and communicates the reconfigurations to the SMO/DU. The SMO/DU provides the reconfiguration to the RU via NETCONF for implementation of the reconfigured logging capabilities.

In another embodiment, a NF such as RU 140 operates to provide logging capability recommendations to an operator of a RAN. In a first case, the NF recommends logging configurations for the troubleshoot logging activities of the data modules and logging modules of the NF. The NF operates to define different sets of recommended troubleshoot logging configurations based upon the current processing and memory usage of the NF, and various deployment scenarios that necessitate different troubleshoot logging configurations. For example, a RU may provide different recommended troubleshoot logging configurations based upon whether the RU is configured in a hierarchical model to a DU, or is configured in a hybrid model to both the DU and a SMO, a number of carriers that are utilizing the RU, the carrier bandwidths, connections to a fronthaul switch, or the like. Then, when the NF is deployed, the NF will provide a recommended troubleshoot logging configuration based upon a detected deployment scenario. The operator can then decide to accept the recommended troubleshoot logging configuration or to configure the NF with a custom troubleshoot logging configuration, as needed or desired.

During runtime operation, the NF monitors the troubleshoot logging activities associated with the various logging modules and data modules. The monitored troubleshoot logging activities may include log processing and memory utilization, event counts and event rates, and over-writing status and rates. Then, based on the troubleshoot logging activities, the NF operates to provide updated recommended troubleshoot logging configurations to the SMO/DU. For example, if a particular logging module that is being operated with a lighter overhead (logging error counts before over writing, logging error rates, etc.) begins to experience a higher number of over writes, then the RU can provide an updated troubleshoot logging configuration recommendation to expand the memory allocation for that logging module.

Figure 4:
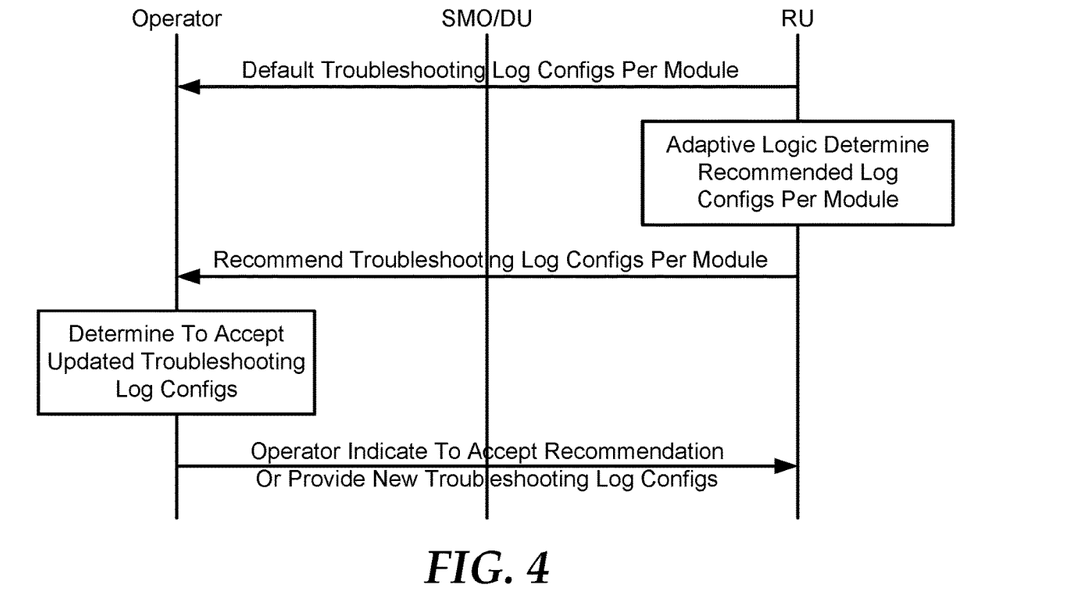
FIG. 4 illustrates a method of providing troubleshoot logging capability recommendations to an operator of a RAN according to an embodiment of the current disclosure.

FIG. 4 illustrates a method of providing troubleshoot logging capability recommendations to an operator of a RAN, and the reconfiguration of the troubleshoot logging capabilities by an operator on the RAN. An RU reports the troubleshoot logging capabilities of the RU to the SMO/DU. Here, in a step not illustrated, the operator may provide its own troubleshoot logging configuration as needed or desired. The RU then monitors the logging activities and provides updated troubleshoot logging configurations to the operator as described above. The operator may then determine to accept the updated troubleshoot logging configurations or to provide new troubleshoot logging configurations to the RU, as needed or desired.

In another case where a NF such as RU 140 operates to provide logging capability recommendations to an operator of a RAN, the NF recommends trace logging configurations for the trace logging activities of the data modules and logging modules of the NF. In this case, the NF monitors the logging activities associated with the various logging modules and data modules. Here, the monitoring of the logging activities may include the monitoring of either the troubleshoot logging activities, the trace logging activities, or both, as needed or desired. For example, where a logging module is operating providing troubleshoot logging with a heavier overhead, then the RU can provide an updated logging configuration recommendation to turn on trace logging for that logging module. The operator can then decide whether or not to apply the new logging configuration recommendation.

Figure 5:
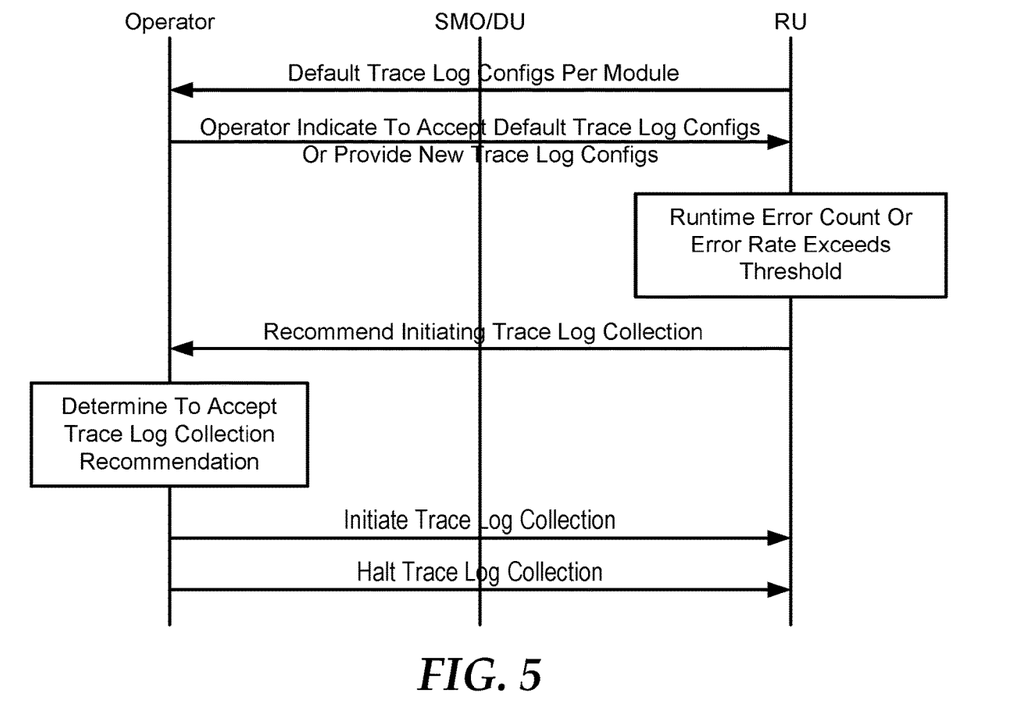
FIG. 5 illustrates a method of providing trace logging capability recommendations to an operator of a RAN according to an embodiment of the current disclosure.

FIG. 5 illustrates a method of providing trace logging collection recommendations to an operator of a RAN, and the reconfiguration of the trace logging configuration by an operator on the RAN. An RU reports the trace logging capabilities of the RU to the SMO/DU. Here, the operator may provide its own trace logging configuration as needed or desired. The RU then monitors the logging activities and provides updated trace logging configuration recommendations to the operator, similar to the troubleshoot logging configuration recommendations as described above. The operator may then determine to accept the updated trace logging configuration recommendations or to provide new trace logging configurations to the RU, as needed or desired. The operator further initiates the trace logging activities as needed or desired, and then, when the operator has received sufficient trace logs, the operator halts the trace logging activities. Note that in both the case of troubleshoot logging and the case of trace logging, the RU can utilize the log severity in determining updated logging configuration recommendations to the operator.

In another embodiment, a NF, such as RU 140 provides a Yang-based log file format capability that permits for the selection by a SMO/DU of supported and standardized logging reporting and configurations. In particular, the NF includes an attribute, such as a read only register or the like that includes format data defining mechanisms to control the troubleshooting log and trace log file formats. An example of format data may include log file size, file compression method, file extension before the compression, delimiters used in the log file content. Exemplary compression methods may include .gz (DEFLATE), .lz4 (LZ4), .xz (LZMA2-xz utils), .xz (LZMA2-xz utils), or the like. Here, a NetConf client in the SMO/DU operates to query the format data and to select the format mechanisms that will be deployed by the RU.

Figure 6:
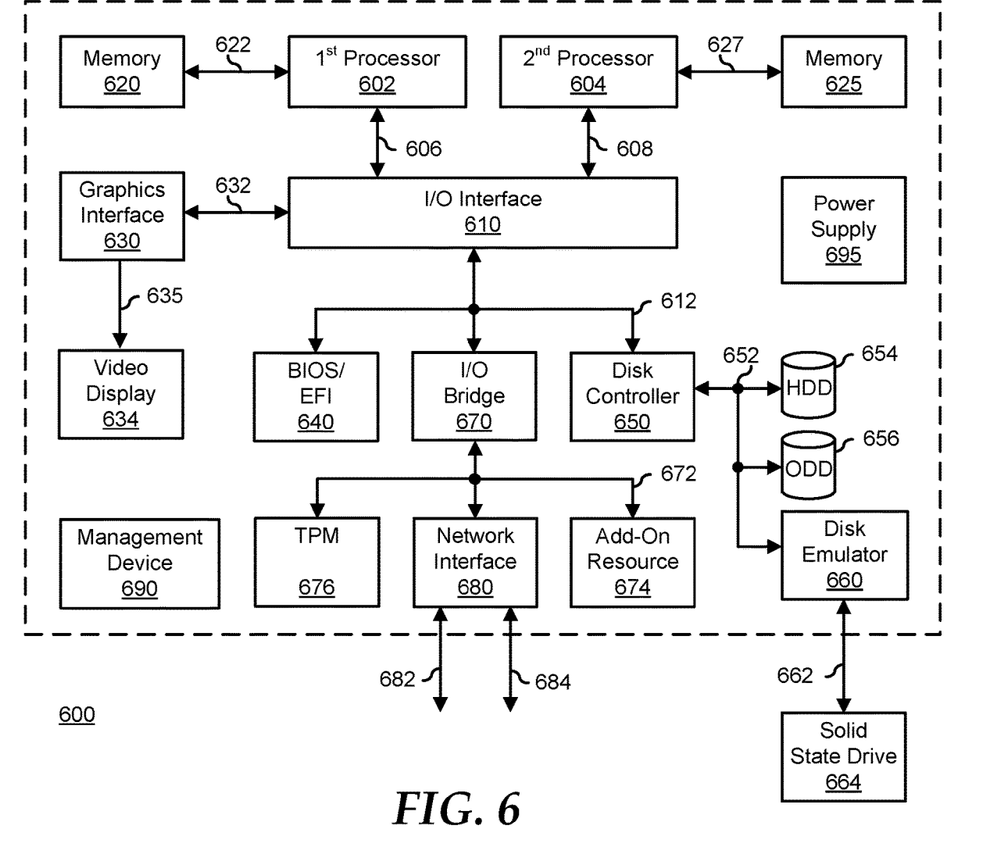
FIG. 6 is a block diagram illustrating a generalized information handling system according to another embodiment of the present disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a virtual machine on a server, a cloud-based device, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620 and 625, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 635 to a video display 634. In a particular embodiment, information handling system 600 includes separate memories that are dedicated to each of processors 602 and 604 via separate memory interfaces. An example of memories 620 and 625 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI- Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on a separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A radio access network, comprising:
   a first hardware system configured to instantiate a radio unit (RU) controller of the radio access network; and
   a second hardware system configured to instantiate a RU of the radio access network;
   wherein:

the RU includes a plurality of data modules each configured to provide a logging capability for the RU;

the RU controller provides a list of access control groups (ACGs) to the RU, each ACG associating an operator on the radio access network with at least one of the data modules;

the RU arranges the data modules into logging modules, each logging module associated with a particular ACG, the RU being configured to restrict access to the data modules based upon the logging modules; and wherein, in response to receiving the list of logging capabilities, the RU controller provides a logging configuration that selects, for each logging module, a particular logging type and a particular severity level for logs provided by each data module in the logging module.

2. The radio access network of claim 1, wherein each data module provides the logging capability in a selectable one of a set of event logging types and a selectable one of a set of event severity levels.

3. The radio access network of claim 2, wherein the event logging types include at least a troubleshoot logging type, and a trace logging type, and wherein the event severity levels include at least a warning severity level, an error severity level, and a fault severity level.

4. The radio access network of claim 2, wherein the list of logging capabilities further includes, for each data module, a set of resources of the RU utilized by the data module in each logging type.

5. The radio access network of claim 4, wherein, in response to receiving the list of logging capabilities, the RU controller provides a log configuration that selects, for each logging module, a particular set of resources of the RU to utilize for each data module in the logging module.

6. The radio access network of claim 5, wherein the RU is configured to monitor a logging activity for a first logging module, to determine that logging activity exceeds a threshold, and to provide a recommendation to the RU controller in response to determining that the logging activity exceeds the threshold, the recommendation including a recommended set of resources of the RU to be utilized by the first logging module.

7. The radio access network of claim 1, wherein the RU controller includes at least one of a service management and orchestration (SMO), a distributed unit (DU), a CU control plane (CU-CP), a CU user plane (CU-UP), a real-time radio intelligent controller (RT RIC), a near real-time radio intelligent controller (near RT RIC), and a non real-time radio intelligent controller (non-RT RIC).

8. The radio access network of claim 7, wherein the supported logging features includes at least one of a log file format, a log file size, a log file compression method, a log file extension format, and a delimiter format.

9. A method, comprising:

instantiating, on a first hardware system, a radio unit (RU) controller of a radio access network;

instantiating, on a second hardware system, a RU of the radio access network;

providing, on the RU, a plurality of data modules, each data module configured to provide a logging capability for the RU:

providing a list of access control groups (ACGs) to the RU, each ACG associating an operator on the radio access network with at least one of the data modules;

arranging the data modules into logging modules, each logging module associated with a particular ACG;

restricting access to the data modules based upon the logging modules; wherein, in response to receiving the list of logging capabilities, the method further comprises providing, by the RU controller, a loci configuration that selects, for each logging module, a particular logging type and a particular severity level for logs provided by each data module in the logging module.

10. The method of claim 9, further comprising providing, by each data module, the logging capability in a selectable one of a set of event logging types and a selectable one of a set of event severity levels.

11. The method of claim 10, wherein the event logging types include at least a troubleshoot logging type, and a trace logging type, and wherein the event severity levels include at least a warning severity level, an error severity level, and a fault severity level.

12. The method of claim 10, wherein the list of logging capabilities further includes, for each data module, a set of resources of the RU utilized by the data module in each logging type.

13. The method of claim 12, wherein, in response to receiving the list of logging capabilities, the method further comprises providing a log configuration that selects, for each logging module, a particular set of resources of the RU to utilize for each data module in the logging module.

14. The method of claim 13, further comprising:

monitoring, by the RU, a logging activity for a first logging module; determining that logging activity exceeds a threshold; and providing a recommendation to the RU controller in response to determining that the logging activity exceeds the threshold, the recommendation including a recommended set of resources of the RU to be utilized by the first logging module.

15. The method of claim 9, further comprising providing a list of supported logging features to the RU controller, wherein the supported logging features includes at least one of a log file format, a log file size, a log file compression method, a log file extension format, and a delimiter format.

16. A radio access network, comprising:

a first hardware system configured to instantiate a service management and orchestration (SMO) module of the radio access network;

a second hardware system configure to instantiate a distributed unit (DU) of the radio access network; and a third hardware system configured to instantiate a radio unit (RU) of the radio access network;

wherein:

the RU includes a plurality of data modules each configured to provide a logging function for the RU:

the SMO module provides a list of access control groups (ACGs) to the RU via the DU, each ACG associating an operator on the radio access network with at least one of the data modules;

the RU arranges the data modules into logging modules, each logging module associated with a particular ACG, the RU being configured to restrict access to the data modules based upon the logging modules;

wherein, in response to receiving the list of logging capabilities, the method further comprises providing, by the RU controller, a log configuration that selects, for each logging module, a particular logging type and a particular severity level for logs provided by each data module in the logging module.

\* \* \* \* \*